(12) United States Patent
Pickford et al.

(10) Patent No.: US 7,933,670 B2
(45) Date of Patent: Apr. 26, 2011

(54) MAINTAINING MUSIC PLAYBACK

(75) Inventors: David Anthony William Pickford, Redmond, WA (US); Barry Aaron Steinglass, Redmond, WA (US)

(73) Assignee: Mircosoft Corporation, Redmond, WA (US)

( * ) Notice: Subject to any disclaimer, the term of this patent is extended or adjusted under 35 U.S.C. 154(b) by 1114 days.

(21) Appl. No.: 11/652,774

(22) Filed: Jan. 12, 2007

(65) Prior Publication Data

US 2008/0172138 A1 Jul. 17, 2008

(51) Int. Cl.
*G06F 17/00* (2006.01)
(52) U.S. Cl. .......................................... 700/94; 463/35
(58) Field of Classification Search .................. 700/94; 463/35; 84/600, 601, 602; 369/1, 2
See application file for complete search history.

(56) References Cited

U.S. PATENT DOCUMENTS

| | | | | |
|---|---|---|---|---|
| 6,934,812 | B1* | 8/2005 | Robbin et al. | 711/138 |
| 7,500,128 | B2* | 3/2009 | Wong et al. | 713/324 |
| 7,663,045 | B2* | 2/2010 | Schmidt et al. | 84/600 |
| 2006/0255964 | A1* | 11/2006 | Wong et al. | 340/855.8 |
| 2007/0068367 | A1* | 3/2007 | Schmidt et al. | 84/600 |

* cited by examiner

*Primary Examiner* — Vivian Chin
*Assistant Examiner* — Joseph Saunders, Jr.

(57) ABSTRACT

Described is a technology for managing audio playback queues maintained in separate memory spaces, e.g., in a game console, such that that audio playback continues upon transitioning between states (including reboots) that change a memory space's contents. For example, before transitioning from a dashboard mode to a game playing mode, the playback queue in memory space used for the dashboard (and the game) is copied to a second queue in a second (e.g., operating system) memory space. The dashboard queue's contents (often large) are truncated as necessary to fit in the relatively smaller queue space. When transitioning from a game to the dashboard mode, copying the queue back takes place after the dashboard is operational. A third type of queue corresponding to a container of an audio source is also managed, including copying its contents when appropriate to the memory that has the queue currently being used for playback.

20 Claims, 5 Drawing Sheets

MAINTAINING MUSIC PLAYBACK

BACKGROUND

One feature of digital media devices/game consoles such as the Xbox® 360 allows a user to play an in-game sound track other than the musical audio track that accompanies the running game. In general this feature allows the game playing sound effects such as "bleeps" and "blips" to be heard, but substitutes a user's chosen music for that of the game's original music track. For some users, this is particularly desirable when playing old "arcade" style games or newer casual games in which the original music, typically electronically generated, is very repetitive and can quickly become monotonous.

However, a problem with this feature is that the substituted music track stops playing when a user starts a new game, and/or ends the current game such as to return to the game console's dashboard. This is because internally, the system may perform a reboot at such times for various reasons, including security. Alternatively, the system may call an application programming interface to launch a new image, which also causes the music to stop playing. In any event, users are frustrated with having their music playback suddenly halted for taking (what the user considers to be simple) actions that seem unrelated to music playback.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards managing queues of audio lists maintained in separate memory spaces, such that audio playback continues upon transitioning between states that change the contents of one of the memory spaces. In one example, before a transition from a dashboard mode to a game playing mode, the queue is in a first memory space used for the dashboard mode. During the transition to game playing mode, the contents of the queue are copied to a second queue in a second memory space. The dashboard queue's contents (often large) are truncated as necessary to fit in the second queue (which is relatively smaller). Alternatively, when transitioning from a game playing mode to a dashboard mode, the second queue in the second memory space is used until after the transition, upon which it is copied to dashboard queue. A third type of queue corresponding to a container of an audio source is managed, including copying its contents when appropriate to the memory that has the queue currently being used for playback.

In one example implementation, operating system logic copies the queue data in response to the transition, including truncating the data when copying from a larger queue to a smaller queue. The transition may include a reboot operation. Logic also handles starting of audio while a game is running, such as by enumerating the smaller queue with a list from a container corresponding to an audio source, or if too large, enumerating the second queue with one song at a time from an audio source such that the second queue builds a history of audio playback from the audio source. Additional logic that handles transitioning from the game playing mode to the dashboard mode, such as by copying playback queue data to the dashboard space after the dashboard is operational, such that audio playback is not halted upon this transition. The playback queue data may be from a container corresponding to an audio source, and may be copied in a background operation.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards maintaining music playback such that starting or ending a game from a user's perspective, including returning to the console's dashboard (which is equivalent to running a different game), does not cause the currently playing music to stop playing. In general and as described below, no reboots or APIs calls (e.g., to XLaunch-NewImage( ) in an Xbox® environment) cause the currently playing music to stop playing.

In one implementation described herein, maintaining music playback is described in context of an example game console architecture based upon Xbox® 360 technology. However, as can be readily appreciated, this is only one example, and the technology is not limited to any particular game console, or even to game consoles in general, but instead applies to any media playback device including game consoles in which maintaining music playback is desirable but at times would otherwise be adversely affected by internal device operations.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in music (or other audio) playback in general.

Figure 1:
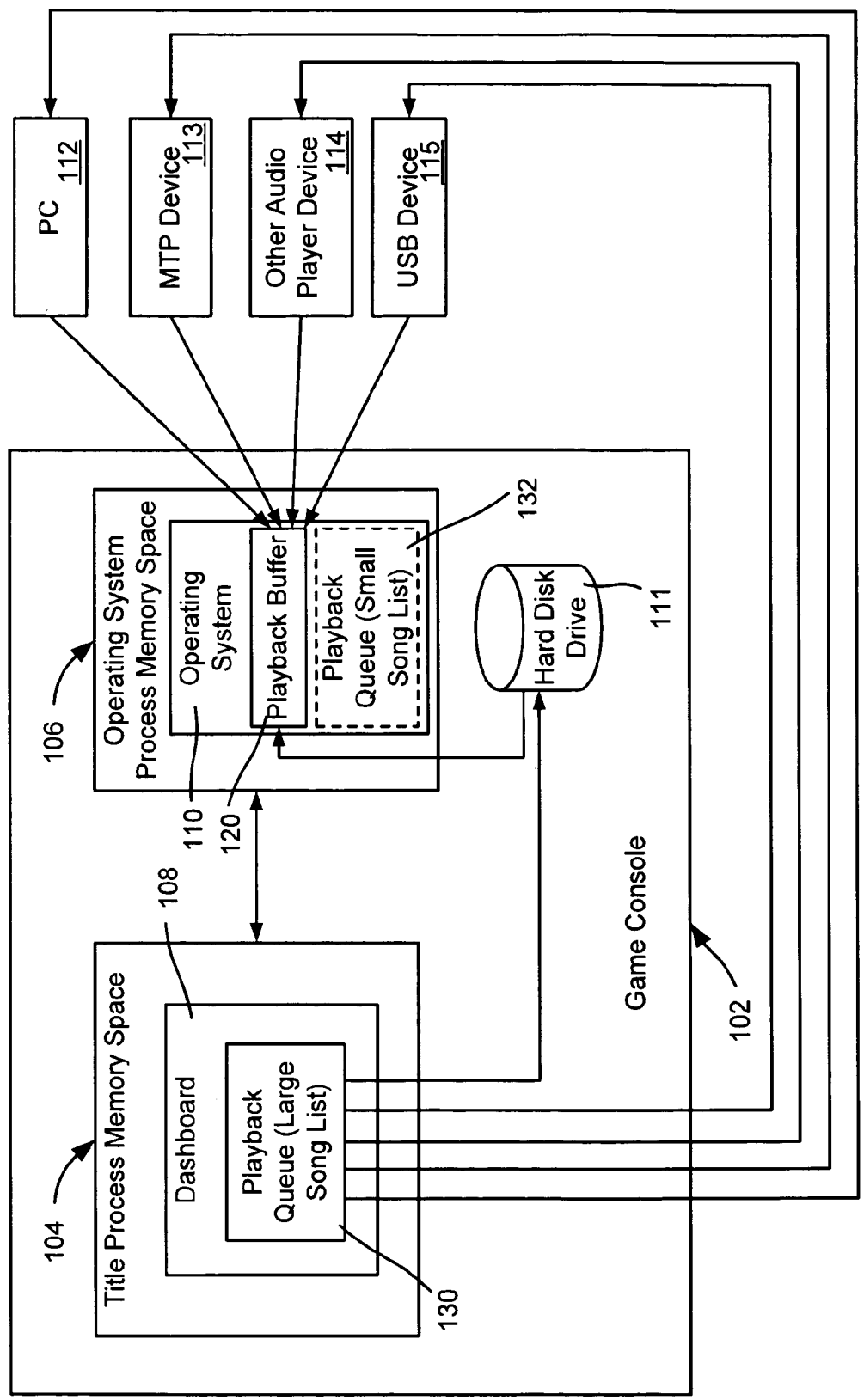
FIG. 1 shows an illustrative example block diagram of a game console that is configured to play back music when in a dashboard mode.
Figure 2:
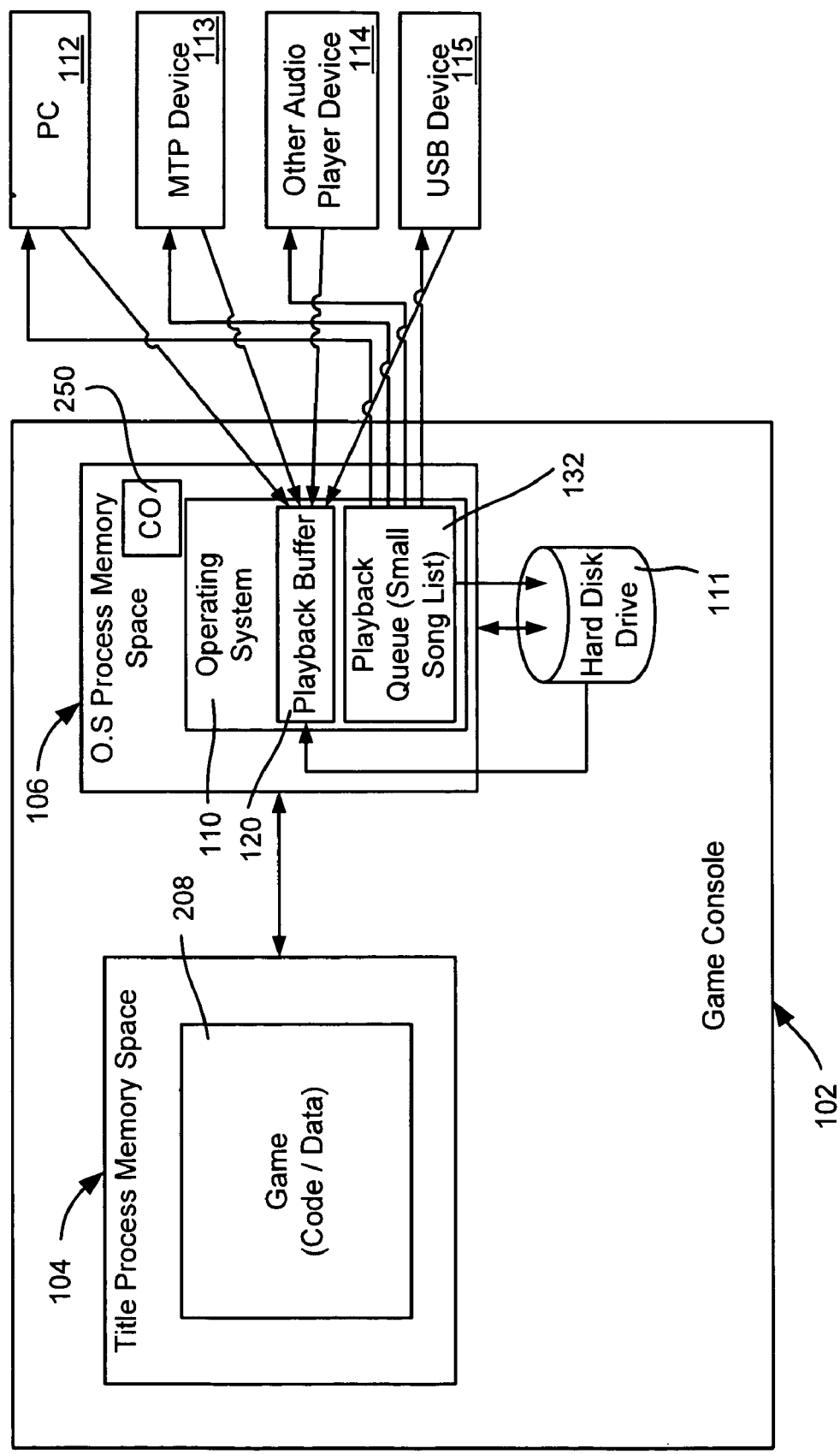
FIG. 2 shows an illustrative example block diagram of a game console that is configured to play back music when in a game playing mode.

FIGS. 1 and 2 show an example architecture in which a game console 102 includes a title (process) memory space 104 and operating system memory space 106. In general, depending on the current operating state, the title memory space 104 contains a dashboard 108, or contains a game (e.g., the game's code and data) as represented in the block labeled 208 in FIG. 2.

The operating system memory space 106 includes the console operating system 110. For audio playback, audio content may be read from various sources 111-115 and decoded by a suitable operating system component into a playback buffer 120. An active playback queue (described below) contains pointers to the sources, e.g., a file path for hard disk drive files. Non-limiting example sources in FIGS. 1 and 2 include a hard disk drive 111 in the console, a personal computer 112, an MTP (media transport protocol) device 113, another audio playback device 114, a USB-compatible device 115 such as a CD-ROM or another hard drive, and so forth. Any or all of such sources 111-115 may be present and accessible at a given time.

As can be seen in FIGS. 1 and 2, one aspect of playback concerns the way that a user's playback queue of songs is stored in memory, namely that the active queue may be different depending on whether the queue was created when the dashboard 108 was running or not. This is because when the dashboard is running, the entire title memory space 104 is available for the dashboard 108, whereby a potentially very large list of songs may be stored in a playback queue 130. In contrast, when the dashboard is not running, the currently loaded game has control of that memory space 104, and a different music playback queue 132 is instead stored in operating system memory space 106, which is relatively far more limited in space, whereby the music playback queue 132 cannot hold as large of a list as the queue 130. For example, in one implementation, the dashboard's queue 130 may hold a list songs on the order of tens of thousands, whereas the operating system's queue 132 may hold a list of songs on the order of a hundred or so. Further, complications arise in that one of many possibly different devices 111-115 may be providing the music at any given time.

To summarize, there are thus different types of queues that may exist, including the queue 130 containing a potentially large list of songs that uses the title's memory space 104, corresponding to dashboard music playback. There is also the queue 132 in operating system memory 106, such as containing a list of N songs, e.g., 100 songs obtained from an external playback device such as one of the devices 113-115.

For some devices, the information needed for the list corresponds to (and for consistency may be limited to) approximately one-hundred songs. If the user tries to play back a larger collection of songs, the list is truncated. For other devices, the operating system space may store information about the container that the user wanted to play, with the queue 132 used to store a history of which songs have been played. To this end, the operating system memory space 106 alternatively (or in addition to) may include a container object 250 which represents a related collection of songs (e.g., an album or genre) from a particular source (CO 250, FIG. 2) and a history of the last N (e.g., 100) songs played from that container (e.g., corresponding to music on the HDD). The maintaining of the history allows playback modes such as shuffle (randomized) playback, repeat and so forth to be implemented.

For completeness, there is also a fourth kind of playback queue, which is created by a game 208, e.g., using APIs. This queue is stored in the game's title memory 208, so the queue can be very large, but it will be lost when exiting the game because the music source (the game) is also going away at that point in time.

Turning to an explanation of operation in one example implementation, persisting music playback across reboots corresponds to defining transition behavior (and an underlying conversion) between the types of playback queues. In general, the currently playing song will continue to play from operating system memory space 106. Note that if transitioning (booting) from a game to another, and the queue is already in the operating system (a non-dashboard queue state), then no changes in the playback queue are made, and playback continues from the operating system.

Figure 3:
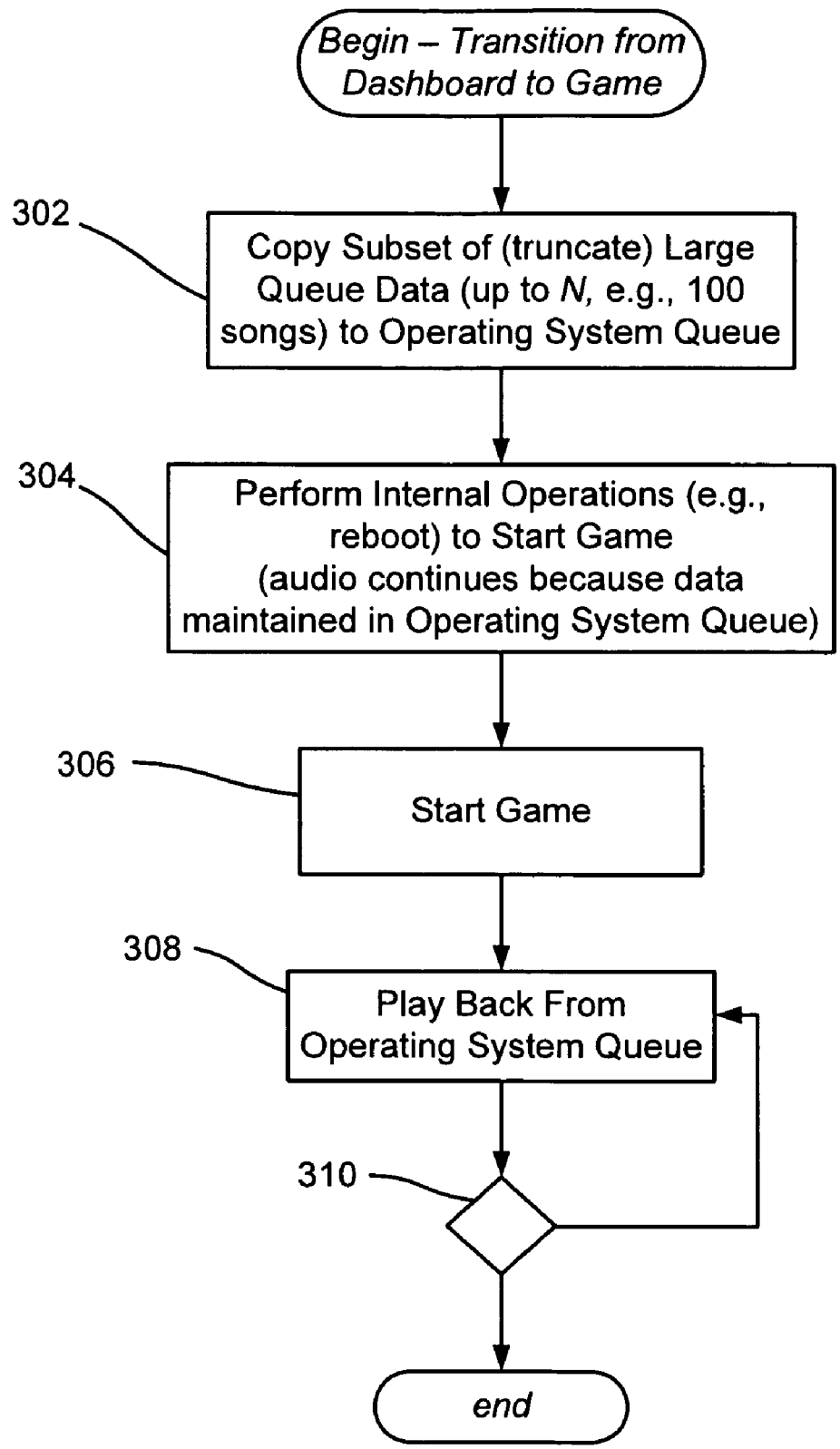
FIG. 3 is a flow diagram representing example steps taken to maintain music playback when transitioning from the dashboard mode to the game playing mode.
Figure 4:
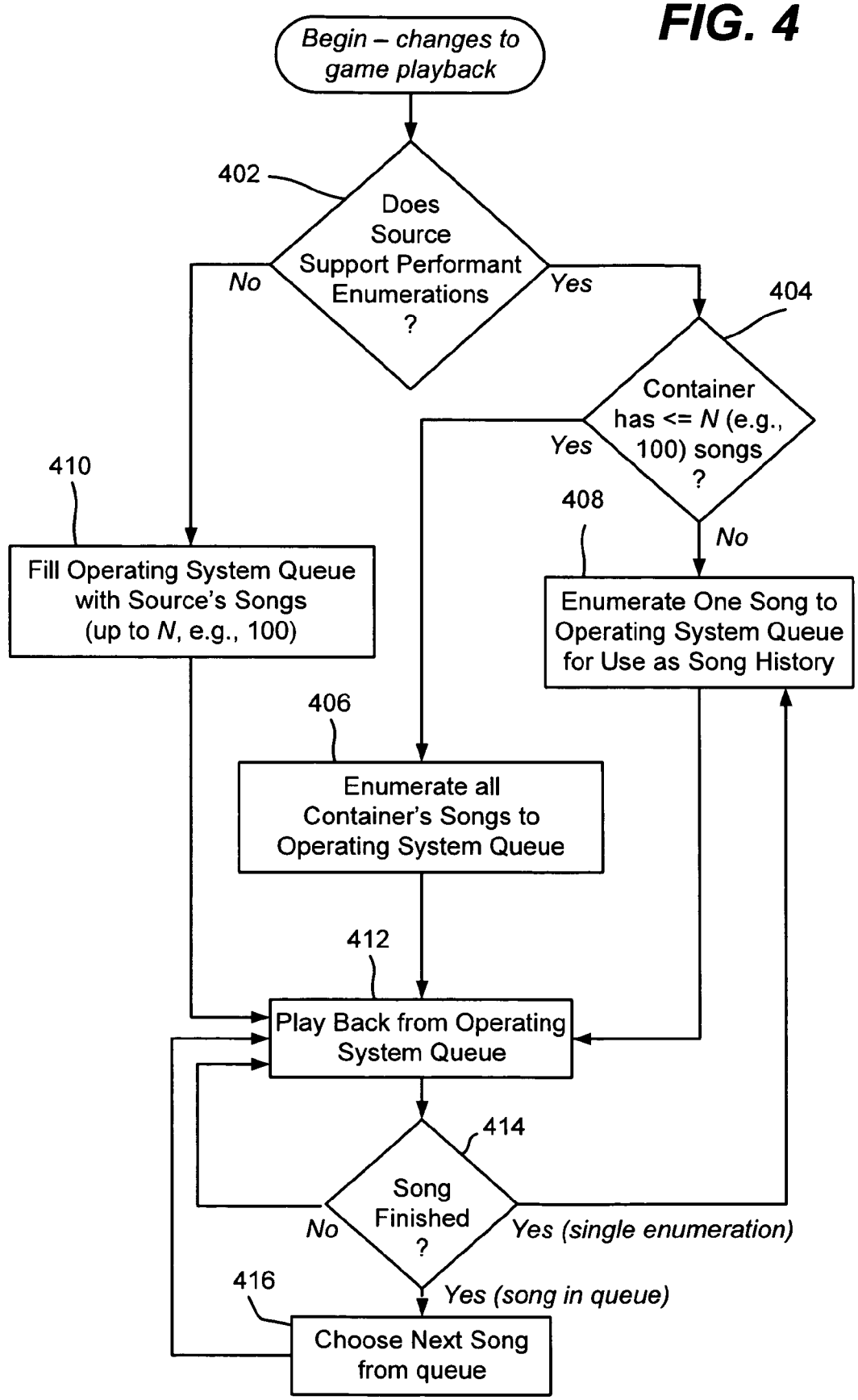
FIG. 4 a flow diagram representing example steps taken to maintain music playback when starting audio playback while in a game playing mode.
Figure 5:
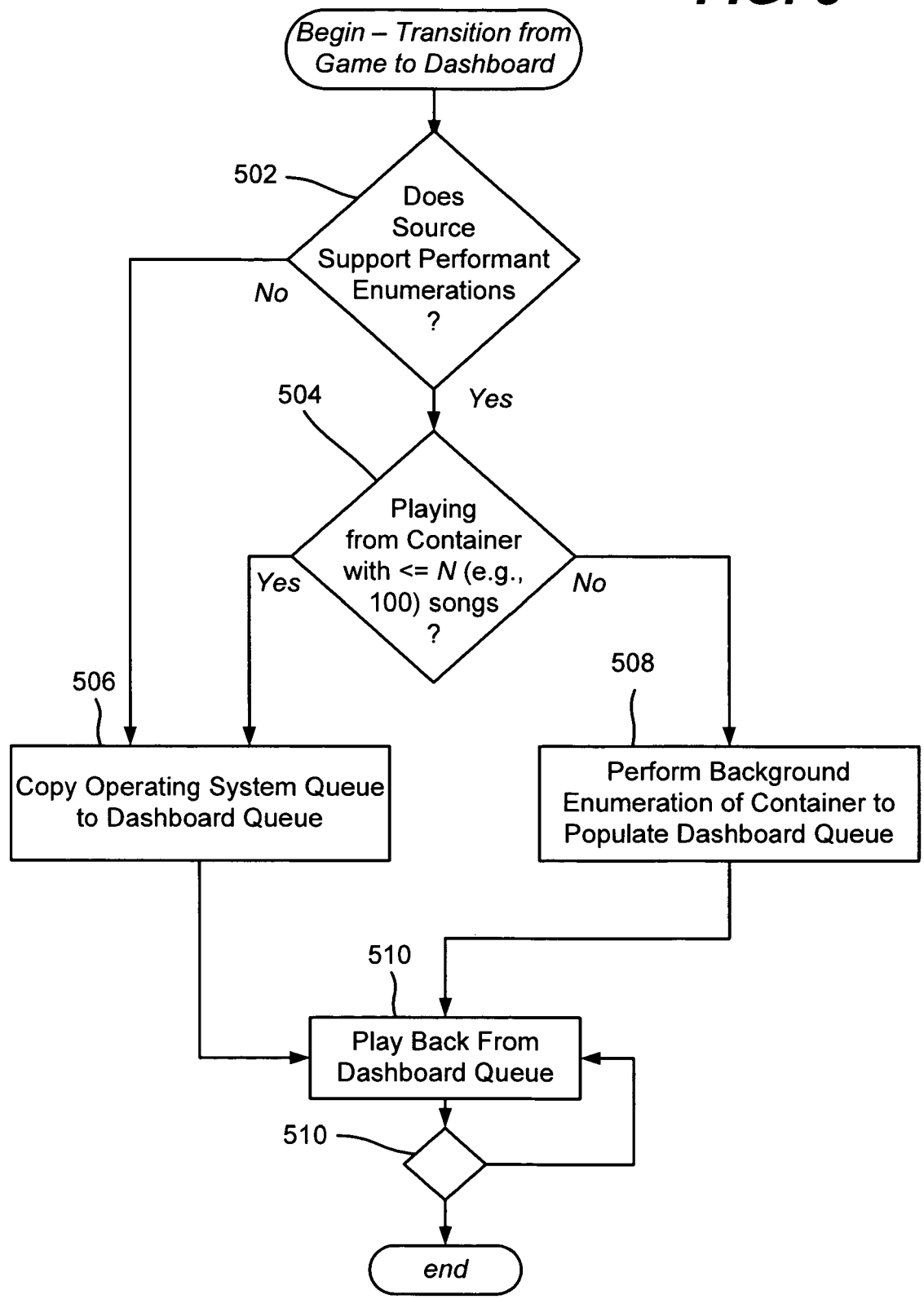
FIG. 5 is a flow diagram representing example steps taken to maintain music playback when transitioning from the game playing mode to the dashboard mode.

FIGS. 3-5 represent the transition operations in other scenarios, beginning at FIG. 3 which represents example steps taken when transitioning from the dashboard to a game (which internally corresponds to a reboot). Note that the example logic of FIGS. 3-5 may be contained in a component or the like of the operating system 110. When switching from the dashboard to a game occurs, as represented at step 302, a subset of the large queue 130 is copied to the small queue 132, that is, the large queue 130 is truncated as necessary via steps 302 and 304. By truncated as necessary, it is meant that if less than N songs' data are in the large queue 130, the entire queue 130 can be copied to the small queue 132. For example, before taking the steps to start the game (including reboot) at step 304, and starting the game (which will take over the title memory space 104) at step 306, the copying operation to operating system memory 106 allows uninterrupted playback to continue from the operating system.

Step 308 represents playing back from the operating system queue 132, until some state change (step 310) ends playback. For example, state changes that can end the song playback include actions such as the user turning off the device, the user disconnecting the source, the user manually ending the song, and so forth.

In one example within this dashboard to game transition scenario, if the user is at a song that is beyond the start of the large dashboard queue, e.g., at the fiftieth song, the large queue's contents are copied such that the small queue 132 includes some number of previously played songs, the current song, and some number of not-yet-played songs; for example, this copy may include up to the last twenty-five played songs, the current song, and the next seventy-four songs. This allows a user to go "back in time" to an extent with respect to playback. One hundred songs corresponds to playback on the order of approximately four to six hours.

FIG. 4 represents a different scenario, corresponding to changes to playback while in a game. For example, while in a game if a user starts playback from a container 250 on a source which supports performant enumeration (e.g., a personal computer 112 such as via Windows® Media Connect or Windows Media Network Sharing Service 112 or the hard disk drive 111) as evaluated at step 402, and the container 250 lists N (e.g., 100) songs or less (step 404), the songs are enumerated into a small queue 132 structure (step 406), since the songs can fit inside the small queue 132. If the container has more than N songs at step 404, each song is enumerated one at a time, when needed as represented via step 408. At this point the queue functions as a history of what the most played songs, up to N. Note that background enumeration to fill the queue is an alternative, however in the example implementation, single enumeration is sufficiently fast.

As represented via step 410, playback from other sources tries to fill up the small queue 132 structure. Note that depending on the device, step 410 may request more than N (e.g., 100) songs, and discard any amount returned beyond N.

Playback is represented at step 412, which typically continues until the song is finished, as represented via step 414. When finished, if single enumeration is taking place, another song is enumerated (step 408), otherwise the next song in the queue is played back (step 416). Note that the queue is maintained for history purposes, e.g., so that the same song is not played back again (unless such a mode is specifically requested by the user). Further, note that other state changes can end the song playback, such as the user turning off the device, disconnecting the source, manually ending the song and so forth, however these are not shown in FIG. 4 for purposes of simplicity.

FIG. 5 represents example steps when booting from a game to the dashboard, beginning at steps 502 and 504, where an evaluation is made as to whether playing from a source which supports performant enumerations. If not, then the contents of the operating system queue 132 are copied into the dashboard's queue 130, as represented by step 506. If the source does support performant enumeration another check is made to check whether a container 250 with less than N (e.g., 100) songs is being used. If so, the contents of the operating system queue 132 are copied into the dashboard's queue 130, as represented by step 506. Playback continues through the reboot, because the operating system is used for the queue until the copy is complete. If playing a container 250 with more than N songs, a background enumeration of the container is performed (step 508) to populate the dashboard queue 130. Step 510 represents playing back from the dashboard queue, until some state change (step 512) ends playback.

Other alternatives are feasible, including compressing the data in some way (e.g., hashing) to maintain a larger number of songs in the small queue. Another alternation is to persist the large queue to the console's (or another) hard drive or similar storage, such as flash memory unit if present, and access it as necessary. Note that writing to a hard drive may slow down starting the game, and thus is not always desirable. Similarly, sometimes writing to a memory unit depending on whether it is available may provide different user experiences, and thus is not always desirable.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a device configured for audio playback, a system comprising:
    a first memory space for storing a game console dashboard and a first memory queue including a list of audio tracks when the device is in a dashboard mode and for storing data for a game when the device is in a game playing mode;
    a second memory space, separate from the first memory space, for storing a second memory queue having less storage space than the first memory queue;
    logic that, before transitioning the device from the dashboard mode to the game playing mode, copies data of the list of audio tracks included in the first memory queue to the second memory queue, including truncating the data of the list of audio tracks when necessary to store a subset of the list of audio tracks in the second memory queue; and
    logic that uses the second memory queue for audio playback while the device is in the game playing mode and after transitioning the device from the game playing mode back to the dashboard mode, such that audio playback is not halted upon transitioning to another game while the device is in the game playing mode and is not halted upon transitioning the device from the game playing mode back to the dashboard mode.

2. The system of claim 1, wherein transitioning the device from the game playing mode back to the dashboard mode includes a reboot operation.

3. The system of claim 1, wherein the second memory space contains an operating system.

4. The system of claim 1, further comprising logic that handles starting of audio playback while the data for the game is in the first memory space.

5. The system of claim 1, further comprising logic that enumerates the second memory queue with a list from a container corresponding to an audio source.

6. The system of claim 5, wherein the audio source supports performant enumerations.

7. The system of claim 1, further comprising logic that enumerates the second memory queue with one song at a time from an audio source such that the second memory queue builds a history of audio played back from the audio source.

8. The system of claim 7, wherein the audio source supports performant enumerations.

9. The system of claim 1, further comprising logic that fills the second memory queue with a list obtained from an audio source.

10. The system of claim 1, further comprising logic that copies data of the second memory queue to the first memory queue, after the first memory space is transitioned from use in the game playing mode back to use in the dashboard mode, such that audio playback continues from the second memory queue until the data is copied to the first memory queue.

11. The system of claim 10, wherein the data of the second memory queue includes data from a container corresponding to an audio sources, and the data is copied from the second memory queue to the first memory queue in a background operation.

12. In a device configured for audio playback, a method comprising:
    managing separate memory spaces including:
        a first memory space for storing a game console dashboard and a first memory queue including a list of audio tracks when the device is in a dashboard mode and for storing data for a game when the device is in a game playing mode, and
        a second memory space for storing a second memory queue having less storage space than the first memory queue;
    before transitioning the device from the dashboard mode to the game playing mode, copying data of the list of audio tracks included in the first memory queue to the second memory queue;
    when necessary, truncating the data of the list of audio tracks to store a subset of the list of audio tracks in the second memory queue; and
    using the second memory queue for audio playback while the device is in the game playing mode and after transitioning the device from the game playing mode back to the dashboard mode, such that audio playback is not halted upon transitioning to another game while the device is in the game playing mode and is not halted upon transitioning the device from the game playing mode back to the dashboard mode.

13. The method of claim 12, wherein transitioning from the game playing mode back to the dashboard mode includes reboot operation.

14. The method of claim 12, further comprising starting of audio playback while the data for the game is in the first memory space.

15. The method of claim 12, further comprising filling the second memory queue with a list obtained from an audio source.

16. The method of claim 12, further comprising enumerating the second memory queue with audio track information from a container corresponding to an audio source based on an amount of audio track information in the container.

17. In a game console, a computer-readable medium having computer-executable instructions, which when executed perform steps, comprising:

managing separate memory spaces including:
- a first memory space for storing a game console dashboard and a first memory queue including a list of audio tracks when the device is in a dashboard mode and for storing data for a game when the device is in a game playing mode, and
- a second memory space for storing a second memory queue having less storage space than the first memory queue;

before transitioning the game console from the dashboard mode to the game playing mode, copying data of the list of audio tracks included in the first memory queue to the second memory queue;

when necessary, truncating the data of the list of audio tracks to store a subset of the list of audio tracks in the second memory queue; and using the second memory queue for audio playback while the device is in the game playing mode and after transitioning the game console from the game playing mode back to the dashboard mode, such that audio playback is not halted upon transitioning to another game while the device is in the game playing mode and is not halted upon transitioning the device from the game playing mode back to the dashboard mode.

18. The computer-readable medium of claim 17 having further computer-executable instructions for filling the second memory queue with a list obtained from an audio source coupled to the game console upon starting audio playback while in the game playing mode.

19. The computer-readable medium of claim 17 having further computer-executable instructions for enumerating the second memory queue with audio track information from a container corresponding to an audio source coupled to the game console.

20. The computer-readable medium of claim 17 having further computer-executable instructions for copying data of the second memory queue to the first memory queue in a background operation.

\* \* \* \* \*

UNITED STATES PATENT AND TRADEMARK OFFICE
CERTIFICATE OF CORRECTION

| | | |
|---|---|---|
| PATENT NO. | : 7,933,670 B2 | Page 1 of 1 |
| APPLICATION NO. | : 11/652774 | |
| DATED | : April 26, 2011 | |
| INVENTOR(S) | : David Anthony William Pickford et al. | |

It is certified that error appears in the above-identified patent and that said Letters Patent is hereby corrected as shown below:

In column 6, line 63, in Claim 13, after "includes" insert -- a --.

Signed and Sealed this
Nineteenth Day of July, 2011

David J. Kappos
*Director of the United States Patent and Trademark Office*